Figure 1B:
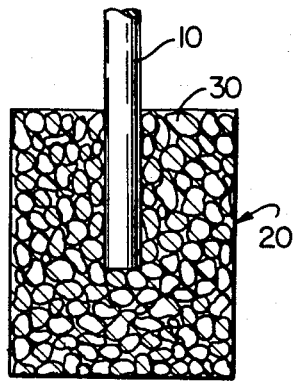

United States Patent [19]

Long et al.

[11] Patent Number: 4,520,430
[45] Date of Patent: May 28, 1985

[54] LEAD ATTACHMENT FOR TANTALUM ANODE BODIES

[75] Inventors: Noel V. Long; Charles H. Mierke, both of Simpsonville, S.C.

[73] Assignee: Union Carbide Corporation, Danbury, Conn.

[21] Appl. No.: 461,967

[22] Filed: Jan. 28, 1983

[51] Int. Cl.³ .............................................. H01G 9/00
[52] U.S. Cl. ........................................ 361/433; 29/570
[58] Field of Search ....................... 29/570, 581, 582; 361/433; 429/211, 218, 245, 237

[56] References Cited

U.S. PATENT DOCUMENTS

| | | | |
|---|---|---|---|
| 2,283,723 | 5/1942 | Clark | 175/315 |
| 2,359,970 | 10/1944 | Clark | 175/315 |
| 2,584,980 | 5/1948 | Brennan | 175/315 |
| 2,733,289 | 1/1956 | Ellison | 317/230 |
| 2,739,275 | 3/1956 | Houtz et al. | 317/230 |
| 2,743,399 | 4/1956 | Bujan | 317/230 |
| 2,744,217 | 5/1956 | Aikman | 317/230 |
| 3,588,626 | 6/1971 | Copper | 317/230 |
| 3,588,627 | 6/1971 | Markarian | 317/230 |

FOREIGN PATENT DOCUMENTS

| | | |
|---|---|---|
| 54-86753 | 7/1979 | Japan . |
| 1082789 | 5/1981 | Japan . |
| 56-110222 | 9/1981 | Japan . |
| 56-120119 | 9/1981 | Japan . |
| 57-53653 | 11/1982 | Japan . |

Primary Examiner—L. T. Hix
Assistant Examiner—Douglas S. Lee
Attorney, Agent, or Firm—Fredrick J. McCarthy, Jr.

[57] ABSTRACT

Tantalum anode bodies having regions of different density with a lead attached to the region of higher density.

7 Claims, 17 Drawing Figures

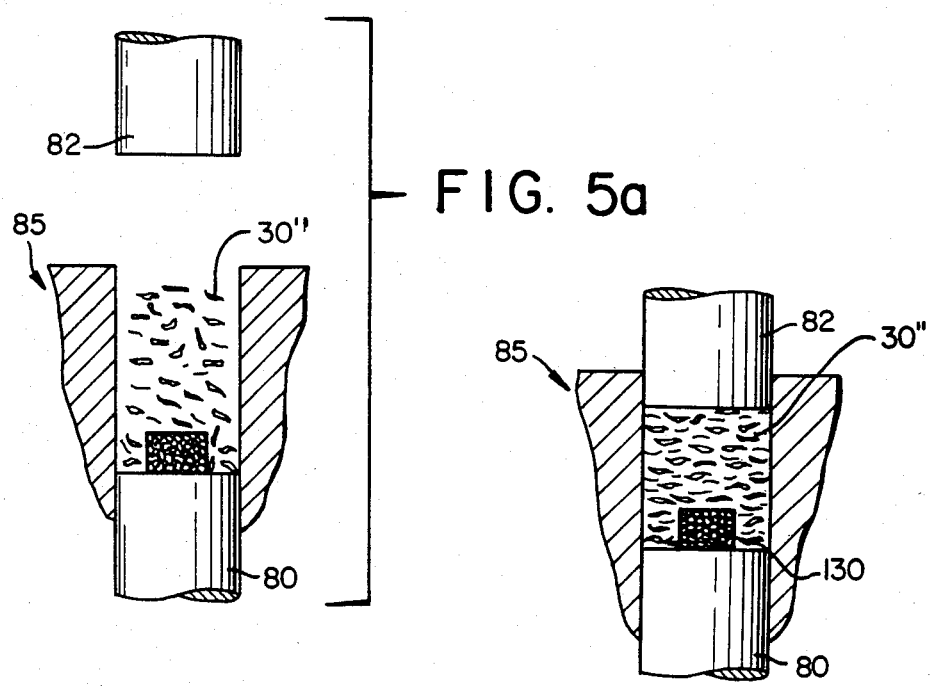
FIG. 5a
FIG. 5b
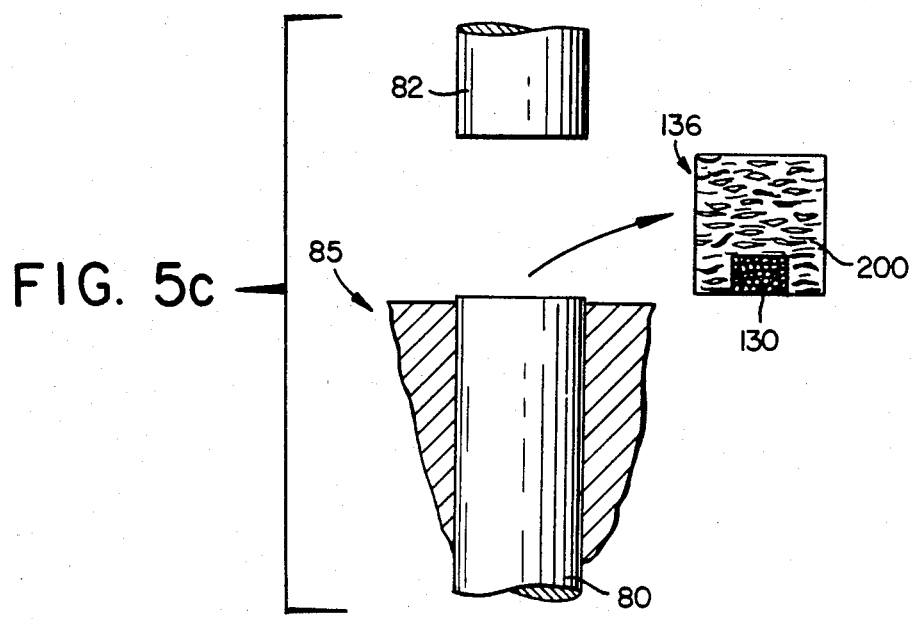
FIG. 5c

LEAD ATTACHMENT FOR TANTALUM ANODE BODIES

The present invention relates to solid electrolytic capacitors. More particularly the present invention is directed to anode bodies for solid electrolytic capacitors.

Solid electrolytic capacitors are well known in the art and are described for example in U.S. Pat. No. 3,166,693—H. E. Haring and R. L. Taylor and U.S. Pat. No. 2,936,514—R. J. Millard.

The anode bodies used in such devices are prepared by forming bodies of pressed powder of an anodizeable metal, most commonly tantalum. The pressed, porous unsintered tantalum bodies are thereafter heated to sinter the powder particles to provide porous sintered anode bodies of tantalum which are employed as anodes for electrolytic capacitors using known conventional techniques such as described in U.S. Pat. No. 3,093,883 whereby the sintered porous tantalum anode body is anodized and provided with an electrolyte layer which is coated in part with an electrically conductive material, e.g., silver or copper, to provide a cathode termination. An anode riser wire is either pressed into the unsintered anode body or is welded to the sintered anode body prior to anodization. In the conventional practice, the porous, sintered tantalum anode body is relatively dense, e.g., 6 to 10 g/cc and the attachments of the anode riser wire to the anode body by conventional welding techniques is readily achieved.

Recently, for economic reasons, it has become important to decrease the amount of tantalum used in an anode body to the extent consistent with achieving satisfactory electrical performance. This has been accomplished by the use of tantalum powder formed of very small flake shaped particles (0.5 to 0.1 micron in thickness) of tantalum having high surface area, e.g., 0.2 to 0.5 m$^2$/g as compared to previously used powders of as low as 0.05 m$^2$/g surface area having an average particle size of 1 to 10 microns. The effective use of such small sized high surface area powders has resulted in sintered anode bodies having a very low density in the range of about 3 to 5 g/cc. The desired electrical capacitance is obtainable with such fine sized high surface area tantalum powder; however, the attachment of the tantalum riser wire to such low density anode bodies by conventional pressing or welding techniques has encountered significant difficulties; for example, the mechanical strength of the attachment is generally poor and electrical properties of the capacitor may be also adversely affected.

It is therefore an object of the present invention to provide a tantalum anode body of overall low density to which a tantalum lead wire can be attached by welding or other conventional techniques to form a sound mechanical and electrical connection.

Other objects will be apparent from the following description and claims taken in conjunction with the drawing wherein FIGS. 1(a), 1(b), 2(a) and 2(b) illustrate prior art sintered tantalum anode bodies.

Figure 3:
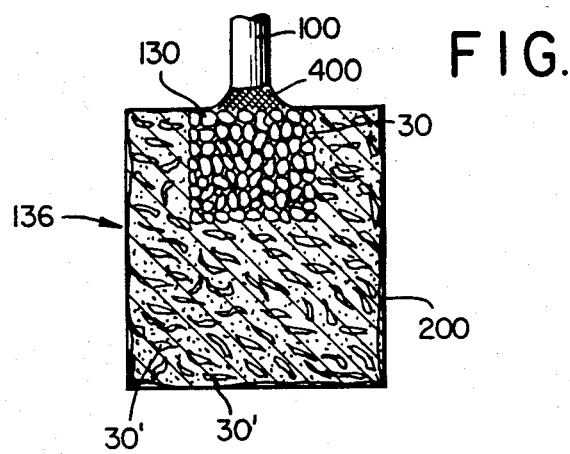
Figure 4A:
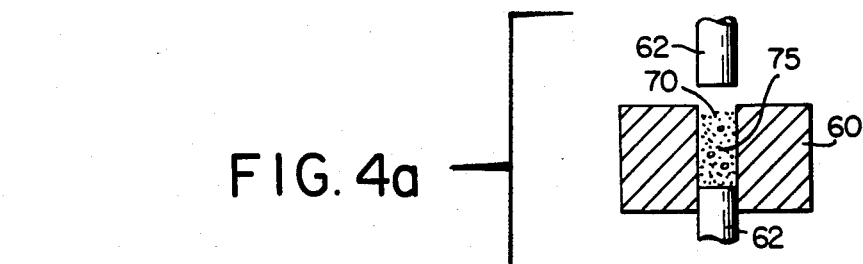
Figure 4B:
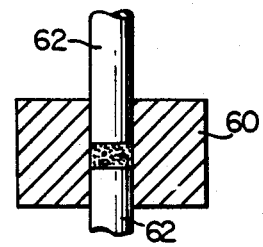
Figure 4C:
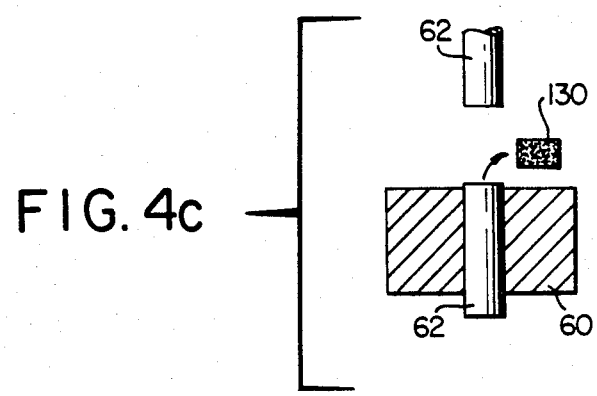

FIG. 3 illustrates an embodiment of the present invention.

FIG. 4(a)–4(c) and 5(a)–5(c) illustrate a procedure for making sintered tantalum anode bodies in accordance with the present invention, and FIGS. 6, 7, 8 and 9 illustrate further embodiments of the present invention.

A tantalum anode body in accordance with the present invention comprises a relatively high density tantalum region, having a density, of about 7 g/cc or higher, metallurgically bonded to a substantially larger, relatively low density porous tantalum region formed of sintered tantalum powder having a density of from about 3 to 5 g/cc, and a tantalum lead wire attached to the high density tantalum region.

Figure 1A:
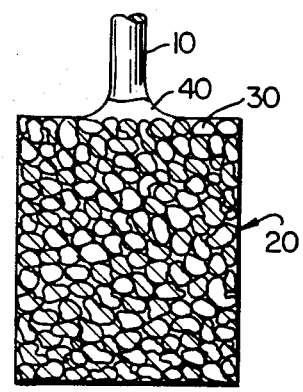

With reference to FIGS. 1(a) and 1(b), in accordance with the prior art, a tantalum lead wire 10 is welded, as in FIG. 1(a), or pressed in, as in FIG. 1(b), to porous sintered tantalum anode bodies 20 which have a density of about 6.0 g/cc and higher. Good mechanical and electrical connection is afforded by the rather large (10–50 micron) equiaxed particles of tantalum 30 used in the prior art. The particles 30 remain essentially stable during sintering, do not deform easily under stress, and provide many large, strong attachment points for the pressed-in lead wire 10 of FIG. 1(b). With welding as in FIG. 1(a), the large size particles 30 and the high density body 20 provide a firm footing for the weld 40. The anode body 20 is typically 0.1" to 0.3" in diameter and 0.1" to 0.6" in height with a 0.010" to 0.030" diameter lead wire.

Figure 2B:
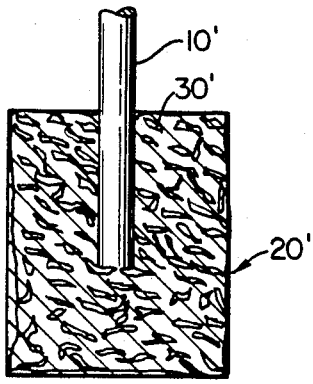
Figure 2A:
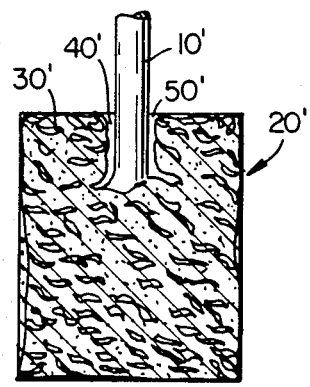

In order to conserve costly tantalum metal and to reduce the size and weight of a given capacitor, attempts have been made to use high surface area tantalum powders to form low density anode bodies, since capacitance is directly related to the tantalum particle surface area. A commonly employed high surface area powder is characterized by very small particle size (about 1 micron in thickness) and thin plate-like flakes of tantalum. FIGS. 2(a) and 2(b) illustrate the problems encountered in the prior art in attaching a lead wire to low bulk density sintered tantalum anode bodies formed of such high surface area powders 30'. The problems become increasingly severe when the density is decreased to 3 to 5 g/cc. The bulk density of solid tantalum is 16.6 g/cc; therefore, such low density sintered tantalum anode bodies are composed of about 25% metal and 75% void space. In FIG. 2(b) fewer particles 30' contact the lead wire 10' to hold it in place, and smaller contact areas with the lead 10' reduce mechanical strength and electrical properties. The flake shaped high surface area particles 30' are more easily deformed than equiaxed particles and this factor contributes to loose anode leads and poor overall electrical performance.

As shown in FIG. 2(a), welding directly to the low density sintered tantalum anode body 20' results in poor mechanical and electrical contact since the thin and small particles 30' melt during welding and collapse and form void 50' in the anode body 20'. The particles 30' are flexible and weak and will not hold the wire 10' rigidly in place. The void 50', and cracks which develop around the welded area, are detrimental to the electrical properties and lead to high leakage failures of the capacitor.

With reference to FIG. 3, the device illustrated therein is in accordance with the present invention, and comprises a relatively high density tantalum region 130 having a density of about 7 g/cc or higher which is metallurgically bonded to a substantially larger, e.g., about 5 to 50 times larger in volume, porous sintered tantalum region 200 having a substantially lower density of about 3 to 5 g/cc. A tantalum lead wire 100 is welded at 400 to the high density region 130 to provide a sound mechanical and electrical connection. With reference to the embodiment of FIG. 3, the high density region 130 is formed using a tantalum powder 30 known in the art for its formability and weldability at densities of about 7.0 g/cc or greater (e.g., a tantalum powder having a Fisher average particle diameter of about 5μ, a surface area of about 0.1 m$^2$g, and a Scott bulk density of at least 30 g/in. such as SGVR4 available from NRC Corporation) using standard powder metallurgical techniques and equipment (e.g., a Harberer press) whereby a pellet 0.085 in diameter, 0.40" thick and having a density of about 7.5 g/cc is formed. Normally 5% by weight binder (e.g. Carbowax, stearic acid, palmeric acid, camphor, Acrawax, glyptol,) is added to the high purity tantalum powder for die lubrication to achieve satisfactory as pressed strength. A technique for fabricating high density region 130 is illustrated in FIGS. 4(*a*)–(*c*), which show a standard pill press in FIG. 4(*a*) with steel die 60 and punches 62 used to make high density pellets 130. The procedure involves filling the cavity 70 with tantalum powder 75, pressing with sufficient pressure (or length of stroke) to attain the proper density, e.g., about 7 g/cc, and ejecting the finished high density insert pellet 130. The performed high density porous tantalum pellet 130 is then placed in the center of the bottom punch 80 of die 85 as shown in FIG. 5(*a*). The powder 30' for the low density region 200 of FIG. 3 is selected for its high surface area and consequently its ability to provide high charge density (e.g., a tantalum powder having a Fisher average particle diameter of about 2μ, a surface area of about 0.5 m$^2$/g, and a Scott bulk density of about 20 g/in$^3$ such as P1-18 available from Hermann C. Starck, Inc., Berlin.) Binder is added to the powder 30' to lubricate and provide strength for the unsintered body. The high surface area powder 30'' is pressed by punches 80, 82, to a desired low density (e.g., 4.0 g/cc) as illustrated in FIG. 5(*b*) and the composite article 136 sized, e.g., 0.195" diameter by 0.212", is ejected as shown in FIG. 5(*c*). It is to be noted that foregoing two-step pressing procedure could be accomplished in a dual action concentric press. The composite body 136 consisting of the high density insert 130 and low density region 200 (FIG. 5 (*c*)) is then dewaxed (e.g., 600° C./30 min.) and sintered at a temperature (e.g., 1600° C./15 min.) sufficient to metallurgically bond high density region 130 to low density region 200 and provide the low density region 200 with satisfactory handling strength. In instances where increased handling strength is important, insert pellets 130 are separately dewaxed (eg., at 600° C. for 30 minutes) and sintered (e.g., 1600° C. for 15 minutes) to form a stronger porous high density sintered pellet 130 prior to assembly in a composite body. Welding of the anode wire 100, as shown in FIG. 3, to high density region 130, e.g., 0.015" tantalum wire available from KBI Inc., by hand or automatically, is readily accomplished by standard techniques (i.e., resistance butt welding) at 4 to 8 lbs. wire pressure, 4 to 8 watt seconds power, and a medium cycle on a Hughes HRW-100B welding power supply. After welding, a final sinter (e.g., 1650° C./5 min.) is given to the assembly to reduce welding stresses and clean up surface oxide formed in welding. The completed anode with lead wire, as illustrated in FIG. 3 in accordance with the present invention, is ready for further processing into a complete capacitor by standard techniques.

In the above-described embodiment of the present invention, the diameter of the high density porous region 130 illustrated in FIG. 3 is suitably about ⅓ to ½ of the overall diameter of the composite anode body 136 and the diameter of high density region 130 is suitably about 3 to 6 times the diameter of the lead wire to enable sound attachment by welding. The length of high density region 130 is suitably 5 to 20% of the overall length of the composite body 136. It is to be noted that in the above described embodiment the high density region 130, being a porous tantalum body, contributes to the overall capacitance of the composite anode body 136. Capacitors prepeared in the manner described above were mechanically and electrically tested and found to be of excellent quality.

The strength of the lead wire weld at 400 of FIG. 3 was determined by a simple bend test, as follows. While holding the composite anode body 136 fixed, the lead wire 100 was bent over parallel to the welding surface and then rotated 180°. Welds surviving this test were routinely produced. Quantitatively a pull strength of greater than six pounds was required to separate the wire 100 from the composite anode body 136. The results are shown in Table 1 compared to results obtained without the use of a high density region. After anodization, all tensile failures were in the lead wire, itself.

TABLE I

|  | Prior Art Low Density Anode Without High Density Region | This Invention |
|---|---|---|
| Ability to bend lead wire 90° | No | Yes |
| Ability to rotate wire 180° after bend test | No | Yes |
| Tensile pull test for strength of weld | 1 lb. | 6 to 10 lbs |

Extensive electrical tests were performed on finished capacitors in accordance with the present invention; typical parameters are given in Table II for the anode body dimensions indicated. Life test data and yields were comparable to those of prior art high density anodes.

TABLE II

|  | High Density Region | Overall Anode Body | Lead Wire |
|---|---|---|---|
| Diameter: | 85 mils | 195 mils | 15 mils |
| Height: | 40 mils | 213 mils | — |
| Weight: | .028 g. | .417 g. | — |
| Capacitance: |  | 100 μF |  |
| Voltage Rated: |  | 20 Volts |  |
| Leakage: |  | 2 μA |  |
| DF @ 120 Hz: |  | 3% |  |
| DF @ 1 KHz: |  | 7% |  |
| Charge Density: |  | 16,000 μC/g |  |

Figure 6:
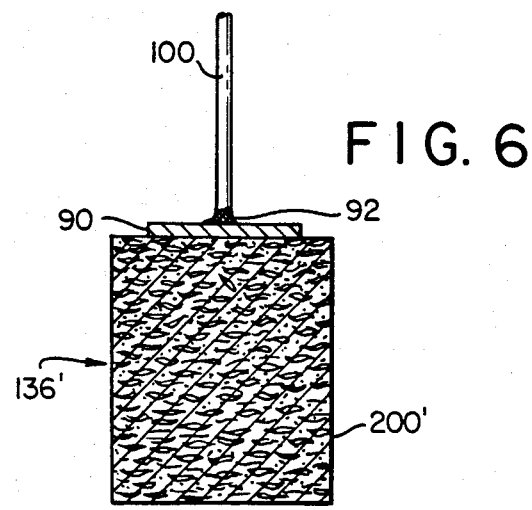
Figure 8:
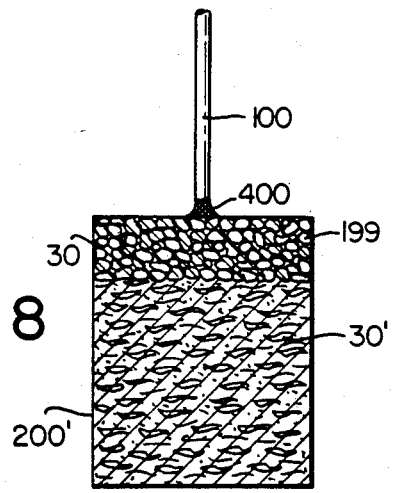

A further embodiment of the present invention is shown in FIG. 6. In this embodiment, a solid tantalum plate 90 is pre-welded at 92 to a tantalum lead wire 100 and plate 90 is then welded to a sintered low density porous tantalum anode body 200' formed from high surface area particles 30', e.g., by resistance welding. Plate 90 constitutes a high density tantalum region and is metallurgically bonded to low density anode body 200' (3 to 5 g/cc) by welding of plate 90 to the underlying high surface area tantalum particles 30' which provide numerous bonding sites and which are not totally melted during welding, since the welding current is distributed over the area of the high density tantalum plate 90. Consequently, the lead attachment to the composite anode body 136' is electrically and mechanically sound. Plate 90 is suitably 0.003 to 0.02 inch thick and suitably overlaps ⅓ to ⅔ of the contacting surface area of low density body 200'.

Capacitors made in accordance with the tantalum plate embodiment of FIG. 6 show equivalent performance to conventionally processed anodes as shown in Table III.

TABLE III

Comparison of Ta Plate and Conventional 100 μf/20 V Capacitor

|  | Typical Leakage | Total Tantalum Weight | % Tantalum Reduction |
|---|---|---|---|
| Conventional Capacitor | 1.17 μA | 0.805 |  |
| Tantalum Plate Capacitor | 1.20 μA | 0.5038* | 37.5% |

*Includes weight of plate

Figure 7:
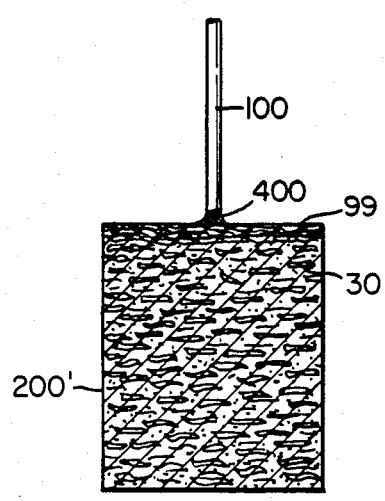

In a further embodiment of the present invention illustrated in FIG. 7, the high density tantalum region is provided by subjecting a surface of a sintered, low density, porous tantalum anode body 200', formed of high surface area particles 30', to radiation from a laser to provide a fused high density layer of tantalum indicated at 99 in FIG. 7, suitably 150 to 300 microns in thickness. A lead wire 100 can be welded, suitably by percussive welding to the fused layer 99 which is metallurgically bonded to the low density anode body 200 as a result of the laser radiation. Typical parameters for the laser treatment are shown below.

Laser: Laser, Inc., Model 11 Nd: glass laser (round beam) argon shielding gas to prevent anode oxidation.
Pulse Length: 5 ms
KV Setting: 2.7
Energy Out of Laser: 40 Joules
Shots: 1
Focal Length Lens: 33.3 cm
Defocused: 7.5 cm
Laser to Lens Distance: 130 cm In a still further embodiment of the present invention, illustrated in FIG. 8, a high density region 199 is provided following the procedure of FIGS. 4(a)–(c) except that instead of a pellet 130, as in FIGS. 4(a)–(c), the shape obtained is a high density disc 199 co-extensive with the cross-section of the low density anode body 200' following the general procedure of FIGS. 5(a)–(c), followed by sintering and lead attachment by welding.

Figure 9A:
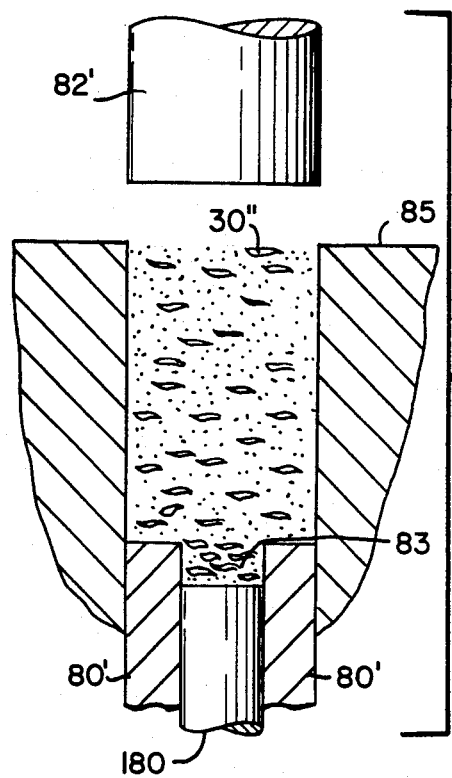
Figure 9C:
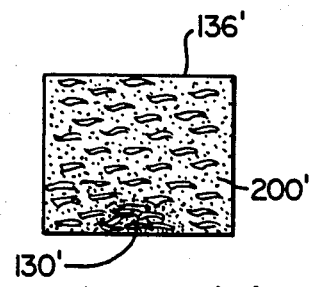
Figure 9B:
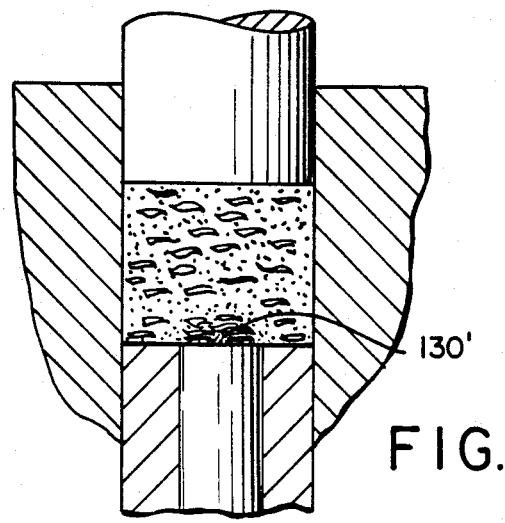

A further embodiment of the present invention formed from high surface area particles 30" involves selectively densifying a portion of an anode body during the pressing thereof as illustrated in FIGS. 9(a)–(c). A punch and die set, similar to that of FIG. 5, can be used having an additional inner punch 180. With this type of die set (or one of similar type) high surface area powder particles 30" fill the die cavity in a shape as shown in FIG. 9(a) having a protruding portion 83. As the press makes its normal cycle the inner punch 180 and outer punch 80' move together initially compacting the powder to a uniform density. At a predetermined point in the press cycle when the overall desired slug density is achieved, e.g., about 3-5 gm/cc, the outer punch 80' ceases further compaction and the inner punch 180 continues to travel until it is flush with the outer punch 80' and compacts the protruding portion 83 as shown in FIG. 9(b). The result is that the powder in the region 130' has a significantly higher density than the remainder of the anode body e.g., about 7 g/cc as compared to 4 g/cc. In the course of subsequent sintering, high density region 130' is metallurgically bonded to the low density body 200'. This embodiment has a great degree of flexibility and the degree of densification of the dense region can be controlled readily by the degree of retarding force on the outer punch. Densitities of about 7 g/cc in the dense region 130' have been consistently achieved. Particular advantages of this embodiment are:

1. Strength—A region of the tantalum anode is conveniently provided which has sufficient mass and strength to assure a good weld with a lead wire. Weld strength of conventionally pressed low-density anodes versus anodes having a densified region as described above are compared in Table IV, as follows:

TABLE IV

Comparative Weld Strength Conventional Low Density Pressed Anodes Versus Anodes With Press Densification Region

|  | Overall anode Density (gm/cc) | Wire Diameter (mm.) | Weld Strength (gms) |
|---|---|---|---|
| Conventional | 4.0 | .381 | 900 |
| This Invention | 4.0* | .381 | 3000 |

*7 gm/cc in region of lead attachment

2. Economy—This embodiment allows a suitable capacitor to be made with substantially less tantalum powder as shown in Table V, below.

TABLE V

Comparative Design of Standard High Density 100 F/20 V Anode and Anode With Press Densification Region

|  | Charge (C/gm) | Tantalum Weight (gms) | % Savings |
|---|---|---|---|
| Conventional | 12000 | .805 | — |
| This Invention | 15000 | .5582 | 30.7 |

While the foregoing description has been directed to anode bodies of generally cylindrical shape, the present invention is applicable to other shapes used in tantalum capacitor manufacture, e.g. bodies of rectangular cross section and the like. Also, it is not necessary that the high density region be axially aligned with the capacitor body and in some instances it may be advantageous to "off-set" the high density region from a central axis of the anode body.

What is claimed is:

1. A tantalum anode body comprising a relatively high density tantalum region having an exposed surface and having a density of about 7 g/cc or higher and being metallurgically bonded to a substantially larger relatively low density porous tantalum region formed of sintered tantalum powder having a density of from about 3 to 5 g/cc and a tantalum wire attached to the high density tantalum region only at its exposed surface.

2. A tantalum anode body in accordance with claim 1 wherein said high density region is formed in situ by densifying a portion of the low density porous body to a density of 7 g/cc or higher.

3. A tantalum anode body in accordance with claim 1 wherein said relatively high density tantalum region is porous and formed of sintered tantalum powder.

4. A tantalum anode body in accordance with claim 1 wherein said relatively high density tantalum region is a tantalum plate.

5. A tantalum anode body in accordance with claim 1 wherein said relatively high density tantalum region is a layer of fused tantalum powder.

6. A tantalum anode body in accordance with claim 1 wherein said anode body has an exposed planar surface a portion of which is a surface of the high density tantalum region to which surface portion said tantalum lead wire is attached.

7. A tantalum anode body in accordance with claim 1 wherein said anode body has an exposed planar surface which is a surface of the high density region to which said tantalum lead wire is welded.

* * * * *